United States Patent
Matsushima

(10) Patent No.: US 7,831,737 B2
(45) Date of Patent: Nov. 9, 2010

(54) APPARATUS, METHOD, AND SYSTEM FOR SELECTING ONE OF A PLURALITY OF COMMUNICATION METHODS FOR COMMUNICATING VIA A NETWORK BASED ON THE DETECTION OF A FIREWALL

(75) Inventor: Hiroyuki Matsushima, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 1023 days.

(21) Appl. No.: 11/439,366

(22) Filed: May 24, 2006

(65) Prior Publication Data

US 2007/0043806 A1    Feb. 22, 2007

(30) Foreign Application Priority Data

May 24, 2005    (JP) .............................. 2005-150415

(51) Int. Cl.
G06F 15/16    (2006.01)
(52) U.S. Cl. ...................... 709/250; 709/203; 709/227; 709/230; 709/236
(58) Field of Classification Search ................ 709/250, 709/203, 230, 227, 336
See application file for complete search history.

(56) References Cited

U.S. PATENT DOCUMENTS

2002/0143855 A1    10/2002    Traversat et al.
2002/0152235 A1    10/2002    Motoyama et al.
2002/0161904 A1*   10/2002    Tredoux et al. ............. 709/229
2004/0148328 A1     7/2004    Matsushima
2005/0228984 A1*   10/2005    Edery et al. ................. 713/153
2006/0085498 A1     4/2006    Matsushima

FOREIGN PATENT DOCUMENTS

| EP | 1 255 395 A2 | 11/2002 |
| EP | 1 418 732 A2 | 5/2004 |
| EP | 1418732 A2 * | 5/2004 |
| JP | 2001-273211 | 10/2001 |
| JP | 2004-135323 | 4/2004 |
| JP | 2004-139586 | 5/2004 |
| JP | 2004-140818 | 5/2004 |
| JP | 2005-316991 | 11/2005 |

OTHER PUBLICATIONS

U.S. Appl. No. 12/051,226, filed Mar. 19, 2008, Matsushima.

* cited by examiner

*Primary Examiner*—Larry Donaghue
*Assistant Examiner*—Nicholas Taylor
(74) *Attorney, Agent, or Firm*—Oblon, Spivak, McClelland, Maier & Neustadt, L.L.P.

(57) ABSTRACT

An apparatus, method, system for communicating with a counterpart communication apparatus via a network using more than one communication procedure or protocol. The communication procedure or protocol is selected based on the presence information or location information of a firewall on the network.

12 Claims, 14 Drawing Sheets

BACKGROUND ART

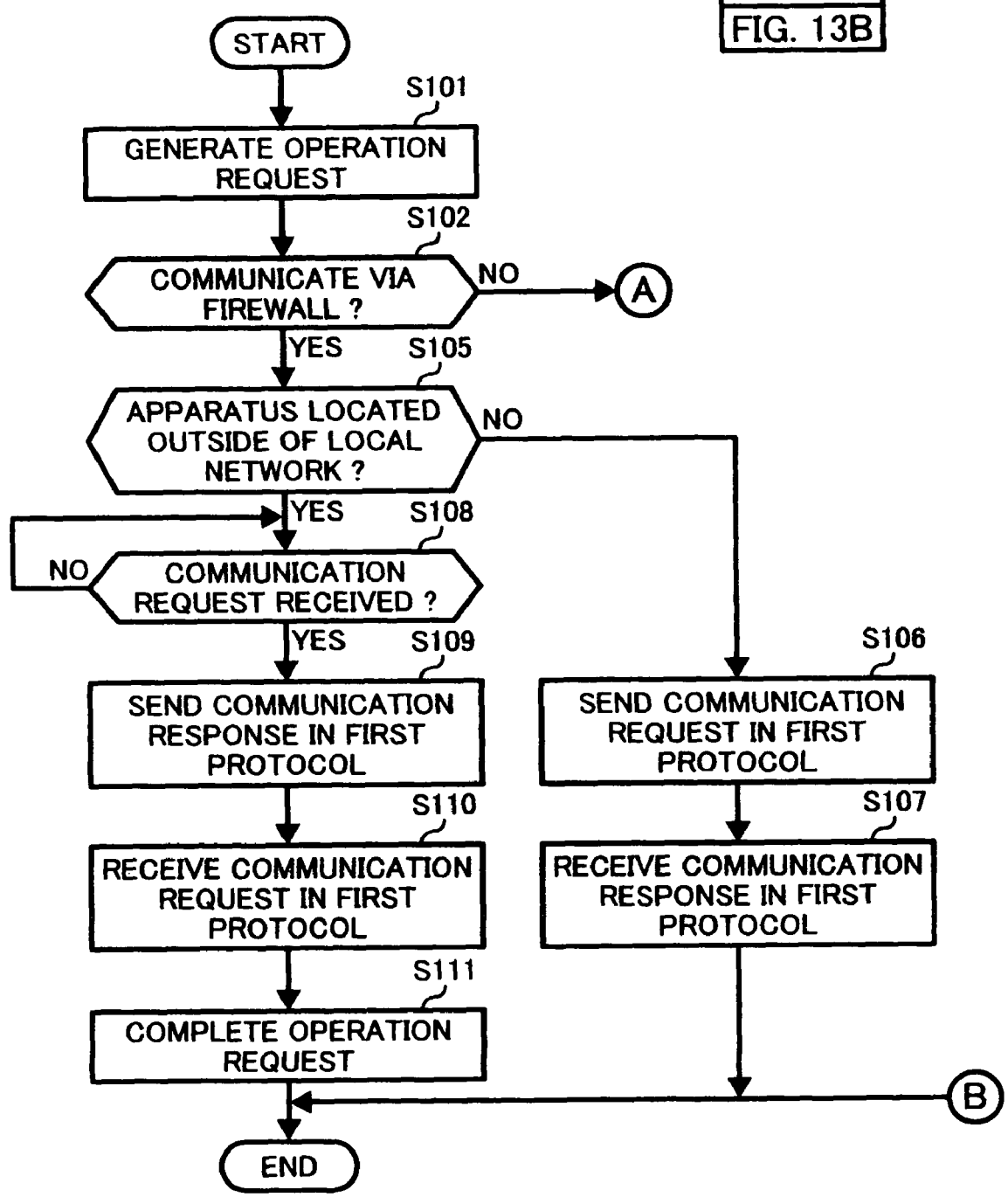

APPARATUS, METHOD, AND SYSTEM FOR SELECTING ONE OF A PLURALITY OF COMMUNICATION METHODS FOR COMMUNICATING VIA A NETWORK BASED ON THE DETECTION OF A FIREWALL

BACKGROUND OF THE INVENTION

1. Field of the Invention

An apparatus, method, system for communicating with a counterpart communication apparatus via a network using more than one communication procedure or protocol. The communication procedure or protocol is selected based on the presence information or location information of a firewall on the network.

2. Description of the Related Art

Today, a large number of apparatuses communicate to one another via a network using a variety of communication procedures or protocols.

For example, in a communication system shown in FIG. 1, a first communication apparatus A and a second communication apparatus B are connected via a network N, such as the Internet. When the first communication apparatus A functions as a client, the first communication apparatus A sends a communication request to the second communication apparatus B. The communication request contains an operation request asking the second communication apparatus B to perform a requested service. In response, the second communication apparatus B, which functions as a server, sends a communication response to the first communication apparatus A. The communication response contains an operation response indicating the result obtained by performing the requested service. Alternatively, when the second communication apparatus B functions as a client, the second communication apparatus B sends the communication request or the operation request to the first communication apparatus A. In response, the first communication apparatus A, which functions as a server, sends the communication response or the operation response to the second communication apparatus B.

The communication system of FIG. 1 may be additionally provided with a firewall F, for example, as illustrated in FIG. 2. The first communication apparatus A is provided outside of a local network including the second communication apparatus B and the firewall F. With this network structure, communication between the first communication apparatus A and the second communication apparatus B may not be established unless the second communication apparatus B allows the first communication apparatus A to access the second communication apparatus B.

For example, in order to send an operation request from the first communication apparatus A to the second communication apparatus B, the first communication apparatus A waits until it receives a communication request from the second communication apparatus B. Upon receiving the communication request from the second communication apparatus B, the first communication apparatus A may request the second communication apparatus B to perform a requested service by sending the operation request to the second communication apparatus B. Upon receiving the operation request, the second communication apparatus B may send an operation response to the first communication apparatus A, which contains the result obtained by performing the requested service.

In another example, in order to send an operation request from the second communication apparatus B to the first communication apparatus A, the second communication apparatus B may send a communication request or an operation request in a substantially similar manner as described above referring to FIG. 1. However, the second communication apparatus B may preferably use a protocol, which is suitable to the firewall.

As described above referring to FIGS. 1 and 2, the first communication apparatus A and the second communication apparatus B communicate differently depending on whether the firewall is provided between the first communication apparatus A and the second communication apparatus B, or whether the firewall is located inside or outside the local network. Accordingly, the structure of the first communication apparatus A or the second communication apparatus B may need to be changed depending on the presence or location of the firewall.

SUMMARY OF THE INVENTION

The present invention provides a communication apparatus capable of communicating with a counterpart communication apparatus via a network using more than one communication procedure or protocol.

For example, when a firewall is provided between the communication apparatus and the counterpart communication apparatus, the communication apparatus communicates with the counterpart communication apparatus using a first communication procedure. When a firewall is not provided between the communication apparatus and the counterpart communication apparatus, the communication apparatus communicates with the counterpart communication apparatus using a second communication procedure. In this manner, the structure of the communication apparatus may not need to be changed depending on the presence of the firewall.

In another example, when the communication apparatus is located outside of a local network including a firewall and a counterpart communication apparatus, the communication apparatus communicates with the counterpart communication apparatus using a first protocol. When the communication apparatus is located inside of the local network including the firewall and the counterpart communication apparatus, the communication apparatus communicates with the counterpart communication apparatus using a second protocol. In this manner, the structure of the communication apparatus may not need to be changed depending on the location of the firewall.

The present invention may be practiced in various other ways, for example, as a communication system including at least one communication apparatus capable of communicating using one or more communication procedures or protocols, a method of selecting a communication procedure or protocol that may be suitable for a network, a computer program that causes any apparatus to function as one of the communication apparatuses of the present invention, a storage device or medium storing such computer program, etc.

BRIEF DESCRIPTION OF THE DRAWINGS

A more complete appreciation of the disclosure and many of the attendant advantages thereof will be readily obtained as the same becomes better understood by reference to the following detailed description of the example embodiments when considered in connection with the accompanying drawings, wherein:

FIGS. 13A and 13B are flowcharts illustrating operation of sending an operation request and receiving an operation response corresponding to the operation request according to an example embodiment of the present invention;

DETAILED DESCRIPTION OF EXAMPLE EMBODIMENTS

Figure 3:
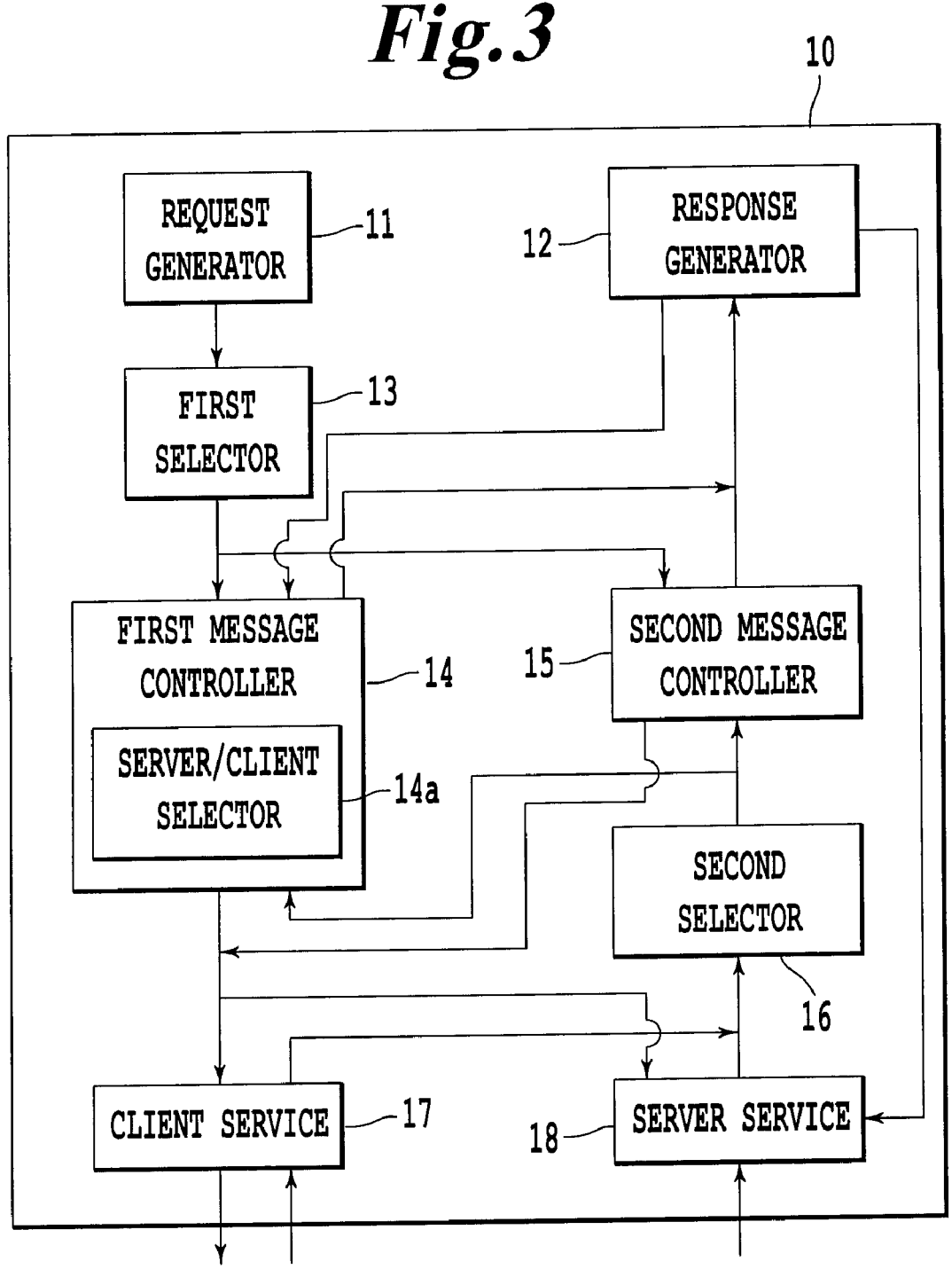
FIG. 3 illustrates the functional structure of a communication apparatus according to an example embodiment of the present invention.

In describing example embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 3 illustrates a communication apparatus 10 according to an example embodiment of the present invention.

The communication apparatus 10 may include a request generator 11, response generator 12, first selector 13, first message controller 14, second message controller 15, second selector 16, client service 17, and/or server service 18. The arrows in FIG. 3 indicate the flow of example commands exchanged among the elements.

In one example operation, the request generator 11 generates an operation request to be sent to another communication apparatus (referred to as the "counterpart communication apparatus") connected to the communication apparatus 10.

The first selector 13 selects either one of the first message controller 14 and the second message controller 15 based on whether a firewall is provided between the communication apparatus 10 and the counterpart communication apparatus. In one example, if the firewall is provided between the communication apparatus 10 and the counterpart communication apparatus, the first selector 13 selects the first message controller 14. If no firewall is provided between the communication apparatus 10 and the counterpart communication apparatus, the first selector 13 selects the second message controller 15. In another example, if the firewall is located outside of a local network to which the communication apparatus belongs, the first selector 13 selects the first message controller 14. If the firewall is located inside of the local network to which the communication apparatus belongs, the first selector 13 selects the second message controller 15.

When the first message controller 14 is selected, the operation request is sent to the first message controller 14. The first message controller 14 may further receive an operation response, which is generated by the response generator 12 based on an operation request received from the counterpart communication apparatus via the server service 18.

The first message controller 14 may put one or more operation requests or operation responses into one communication command. For example, if the communication apparatus 10 functions as a client, the operation requests or operation responses are put together as a communication request. If the communication apparatus 10 functions as a server, the operation requests or operation responses are put together as a communication response.

To determine whether the communication apparatus 10 functions as a server or a client, the first message controller 14 may be provided with a server/client selector 14a (shown in FIG. 3). The server/client selector 14a determines whether the communication apparatus 10 is located inside of the local network having the firewall or outside of the local network having the firewall, and assigns either one of the client function and the server function to the communication apparatus 10. For example, if the communication apparatus is located inside of the local network having the firewall, the communication apparatus 10 functions as a client. If the communication apparatus is located outside of the local network having the firewall, the communication apparatus 10 functions as a server. Alternatively, the above-described function of determining whether the communication apparatus 10 functions as a server or client may be performed by the first selector 13.

When the second message controller 15 is selected, the operation request is sent to the second message controller 15. The message controller 15 may put one or more operation requests into one communication request.

The client service 17 may send the communication request, which is received from at least one of the first message controller 14 and the second message controller 15, to the counterpart communication apparatus. Alternatively, the server service 18 may send the communication response, which is received from the first message controller 14, to the counterpart communication apparatus.

In another example operation, the server service 18 receives a communication request, which is generated by the counterpart communication apparatus, from the counterpart communication apparatus. Alternatively, the client service 17 may receive a communication response, which is generated by the counterpart communication apparatus, from the counterpart communication apparatus.

The second selector 16 selects either one of the first message controller 14 and the second message controller 15 in a substantially similar manner as described above, for example, based on whether the firewall is provided between the communication apparatus 10 and the counterpart communication apparatus. Alternatively, the second selector 16 may make the selection based on the data structure of the communication request or response. The second selector 16 sends the communication request to the selected one of the first message controller 14 and the second message controller 15. Alternatively, the second selector 16 may send the communication response to the first message controller 14.

When the first message controller 14 is selected, the first message controller 14 may extract one or more operation requests from at least one of the communication request received from the server service 18 and the communication response received from the client service 17. The response generator 12 generates one or more operation responses, which correspond to the operation requests extracted by the first message controller 14. The first message controller 14 may further extract one or more operation responses from at least one of the communication request received from the server service 18 and the communication response received from the client service 17. The operation responses may be stored in the first message controller 14, and sent together with the operation requests generated by the request generator 11 as a communication request or communication response.

When the second message controller 15 is selected, the second message controller 15 may extract one or more operation requests from the communication request received from the server service 18. One or more operation responses may be sent together as a communication response through the server service 18.

The communication apparatus 10 may communicate with the counterpart communication apparatus in various other ways, as described below or as apparent to those skilled in the art.

Figure 4:
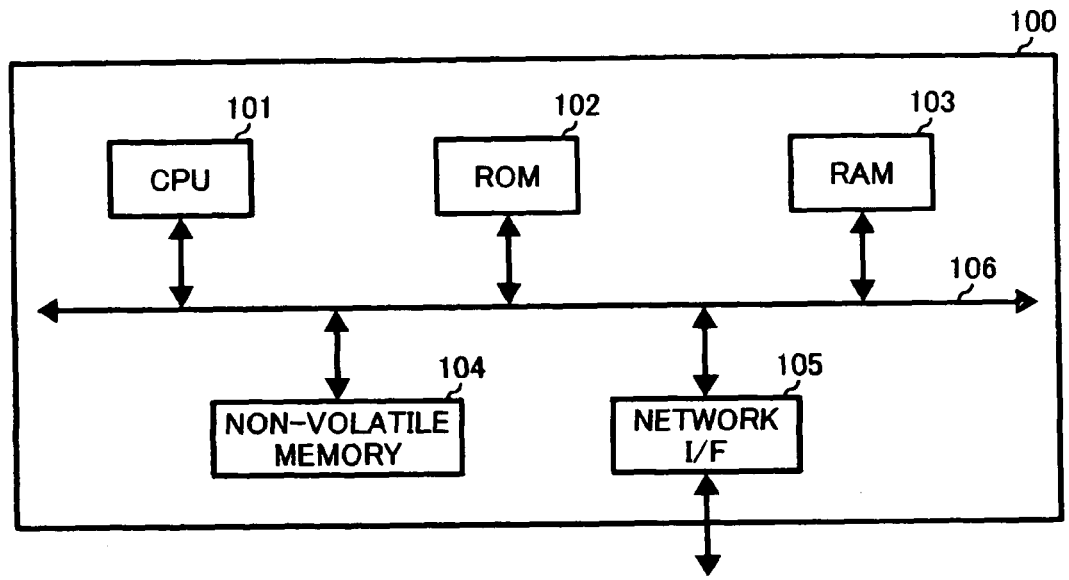
FIG. 4 illustrates an example hardware structure of the communication apparatus shown in FIG. 3.

The communication apparatus 10 may be implemented in various ways, for example, as an information processing apparatus 100 having the hardware structure shown in FIG. 4. Referring to FIG. 4, the information processing apparatus 100 includes a central processing unit (CPU) 101, a read only memory (ROM) 102, a random access memory (RAM) 103, a non-volatile memory 104, and a network interface (I/F) 105, which are connected via a system bus 106.

The CPU 101 may be implemented by any kind of processor, which controls operation of the information processing apparatus 100. The ROM 102 may be implemented by any kind of non-volatile memory, which stores various computer programs or parameters. The ROM 102 may be replaced by any kind of rewritable memory, which may be updated on the regular basis. The RAM 103 may be implemented by any kind of memory, which temporarily stores data or works as a work memory of the CPU 101. The non-volatile memory 104 may be implemented by any kind of rewritable memory, such as a flash memory or a hard disk drive (HDD), which stores various computer programs or parameters. The network I/F 105 connects the communication apparatus 10 to a network, such as the LAN 12 or the Internet 13.

In operation, any one of the functions described above referring to FIG. 3 may be performed by the CPU 101 when the CPU 101 loads at least one of the computer programs stored in the ROM 102 or non-volatile memory 104. Alternatively, the computer program may be downloaded from the external apparatus through the network. In this example, the information processing apparatus 100 and the communication apparatus 10 may be used interchangeably.

For example, when the information processing apparatus 100 communicates with a counterpart communication apparatus via a network, the CPU 101 may generate an operation request, which requests the counterpart communication apparatus to perform a requested service.

The CPU 101 determines whether the information processing apparatus 100 communicates with the counterpart communication apparatus via a firewall. When the firewall is provided between the information processing apparatus 100 and the counterpart communication apparatus, the CPU 101 generates a communication request or response, which contains the operation request, in compliance with a first protocol. The communication request or response may further include an operation response, which is stored in the non-volatile memory 104. In this example, the first protocol corresponds to any protocol, which may not be filtered by a firewall.

When no firewall is provided between the information processing apparatus 100 and the counterpart communication apparatus, the CPU 101 generates a communication request, which contains the operation request, in compliance with a second protocol. In this example, the second protocol corresponds to any protocol, which may work over the Internet, including the first protocol.

The CPU 101 sends the communication request or response to the counterpart communication apparatus via the network I/F 105.

Figure 5:
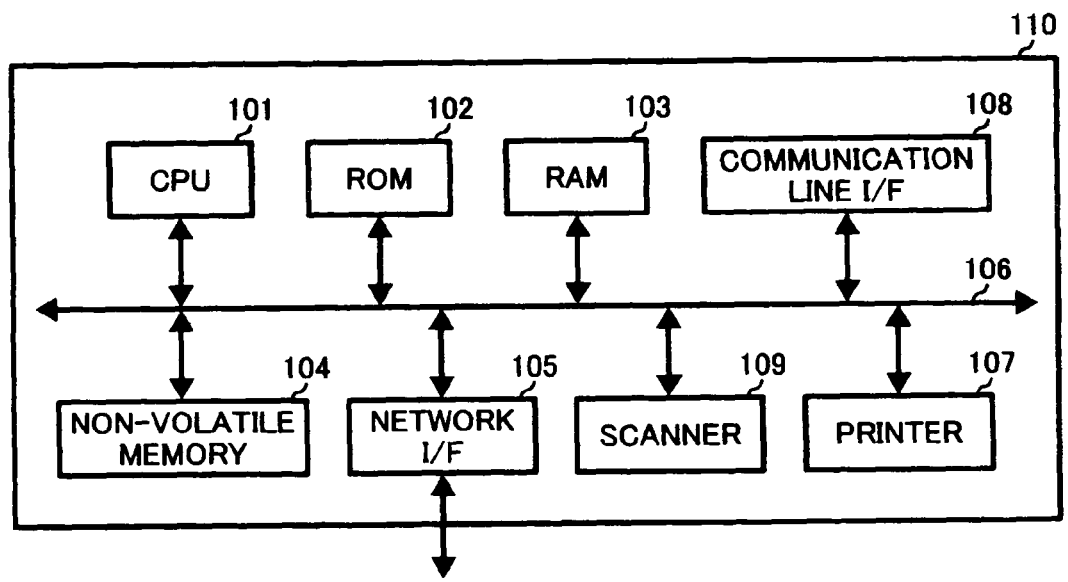
FIG. 5 illustrates an example hardware structure of the communication apparatus shown in FIG. 3.

Alternatively, the communication apparatus 10 of FIG. 3 may be implemented by a multifunctional apparatus (MFP) 110 having the hardware structure shown in FIG. 5. The hardware structure of FIG. 5 is substantially similar to the hardware structure shown in FIG. 4. The differences include the addition of a scanner 109, printer 107, and communication line interface (I/F) 108. The scanner 109 scans an original document into scanned data. The printer 107 prints the scanned data as a printed document. The communication line I/F 108 connects the MFP 110 to a communication line, for example, the public switched telephone network (PSTN).

Alternatively, the communication apparatus 10 of FIG. 3 may be implemented by any kind of office appliance equipment such as a printer, facsimile, copier, scanner, personal digital assistant (PDA) device, phone, general-purpose computer, etc., any kind of consumer electric appliance such as a refrigerator, television, DVD player, air conditioner, etc., or any other kind of electric apparatus such as a vender, medical equipment, power supply, meter, automobile, aircraft, etc.

Figure 6:
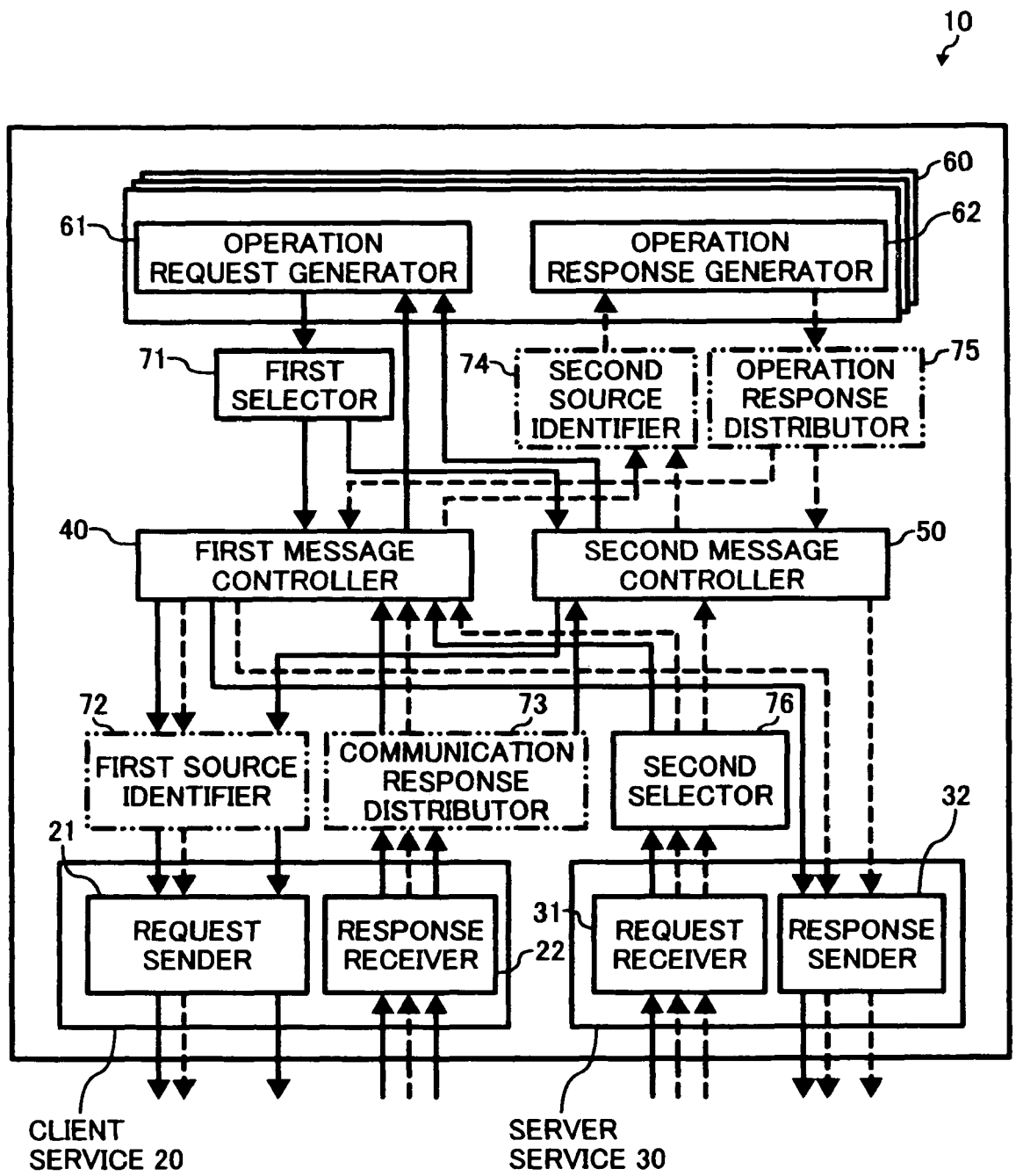
FIG. 6 illustrates an example software structure of the communication apparatus shown in FIG. 3.

Alternatively, the communication apparatus 10 of FIG. 3 may be implemented by one or more modules as illustrated in FIG. 6. Referring to FIG. 6, the communication apparatus 10 may include a client service 20, server service 30, first message controller 40, second message controller 50, application 60, first selector 71, first source identifier 72, communication response distributor 73, second source identifier 74, operation response distributor 75, and/or second selector 76. In FIG. 6, the solid-line arrows indicate the flow of example commands that are related to an operation request generated by the communication apparatus 10. The dashed-line arrows indicate the flow of example commands that are related to an operation request generated by the counterpart communication apparatus.

When the communication apparatus 10 functions as a client, the client service 20 sends a communication request via a communication request sender 21, or receives a communication response via a communication response receiver 22. When the communication apparatus 10 functions as a server, the server service 30 receives a communication request via a communication request receiver 31, or sends a communication response via a communication response sender 32. In this example, the communication request or communication response is generated in compliance with the HyperText Transfer Protocol (HTTP). Accordingly, the communication request sender 21 sends a HTTP request to the counterpart communication apparatus. The communication response receiver 22 receives a HTTP response from the counterpart communication apparatus. The communication request receiver 31 receives a HTTP request from the counterpart communication apparatus. The communication response sender 32 sends a HTTP response to the counterpart communication apparatus. However, any other kind of protocol may be used, for example, the Simple Mail Transfer Protocol (SMTP).

The application 60 includes an operation request generator 61 and an operation response generator 62. In this example, the operation request generator 61 generates an operation request, which asks an application of the counterpart communication apparatus to perform a requested service. The operation response generator 62 generates an operation response, which indicates the result obtained by performing a requested service requested by the counterpart communication apparatus. For example, the operation request may ask the counterpart communication apparatus to perform a service in compliance with the Remote Procedure Call (RPC) protocol. Upon receiving the operation request, the counterpart communication apparatus performs the requested service, and sends the reply to the communication apparatus 10 as the operation response.

The application 60 may include more than one operation request generator 61 or more than one operation response generator 62. As illustrated in FIG. 6, more than one application 60 may be provided in the communication apparatus 10.

Still referring to FIG. 6, the application 60 communicates with the client service 20 or the server service 30 via either one of the first message controller 40 and the second message controller 50.

In one example, the first message controller 40 and the second message controller 50 are each capable of generating the communication request or communication response. For example, upon receiving the operation request from the operation request generator 61, the first message controller 40 stores the operation request as a Simple Object Access Protocol (SOAP) envelop. One or more SOAP envelops may be packed into the HTTP request or response, which will be sent to the counterpart communication apparatus.

In another example, the first message controller 40 and the second message controller 50 are each capable of extracting an operation request or request from the communication request or response. For example, upon receiving the HTTP request or response from the counterpart communication apparatus, the first message controller 40 extracts one or more SOAP envelops from the HTTP request or response, and converts the extracted SOAP envelops to one or more operation requests, which will be sent to the operation response generator 62.

Operation of the first message controller 40 or the second message controller 50 may be performed in various other ways as described below.

The first selector 71 selects either one of the first message controller 40 and the second message controller 50. In this example, when the communication apparatus 10 is located outside of a local network having a firewall and the counterpart communication apparatus, the first selector 71 selects the first message controller 40. When the communication apparatus 10 is located inside the local network having the firewall and the counterpart communication apparatus, the first selector 71 selects the second message controller 50.

In order to specify the location of the firewall relative to the communication apparatus 10 and the counterpart communication apparatus, the communication apparatus 10 may search for the location information, such as the Internet protocol (IP) address, of the counterpart communication apparatus. By comparing the IP address of the counterpart communication apparatus with the IP address of the communication apparatus 10, the first selector 71 can select one of the first message controller 40 and the second message controller 50 as described above. Alternatively, the selection may be previously made if the configuration of the communication apparatus 10 relative to the configuration of the counterpart communication apparatus is determined. Alternatively, the selection may be made manually or automatically, for example, by changing the parameter value.

The first source identifier 72 stores first source information, which indicates the sender of the communication request. The function of the first source identifier 72 may be performed by a call stack, which keeps track of the point to which each active subroutine should return control when the active subroutine finishes executing. The call stack may be hidden depending on the type of complier being used. To indicate this, the first source identifier 72 of FIG. 6 is drawn with the dashed-line.

The communication response distributor 73 distributes the communication response, which is received from the counterpart communication apparatus, to one of the first message controller 40 and the second message controller 50. In this example, the selection is made based on the first source information stored in the first source identifier 72. The function of the communication response distributor 73 may be performed by the call stack. To indicate this, the communication response distributor 73 of FIG. 6 is drawn with the dashed-line.

The second source identifier 74 stores second source information, which indicates the sender of the operation request received from the counterpart communication apparatus. The function of the second source identifier 74 may be performed by the call stack. To indicate this, the second source identifier 74 is drawn with the dashed-line in FIG. 6.

The operation response distributor 75 distributes the operation response, which is generated by the operation response generator 62, to one of the first message controller 40 and the second message controller 50. In this example, the selection is made based on the second source information stored in the second source identifier 74. The function of the operation response distributor 75 may be performed by the call stack. To indicate this, the operation response distributor 75 is drawn with the dashed-line in FIG. 6.

The second selector 76 distributes the communication request, which is received from the counterpart communication apparatus, to one of the first message controller 40 and the second message controller 50. For example, if the HTTP request is received, the second selector 76 may extract the header information from the HTTP request, such as the URL address, to determine the destination of the HTTP request. Alternatively, the second selector 76 may select one of the first message controller 40 and the second message controller 50 depending on the location of the firewall relative to the communication apparatus.

Figure 7:
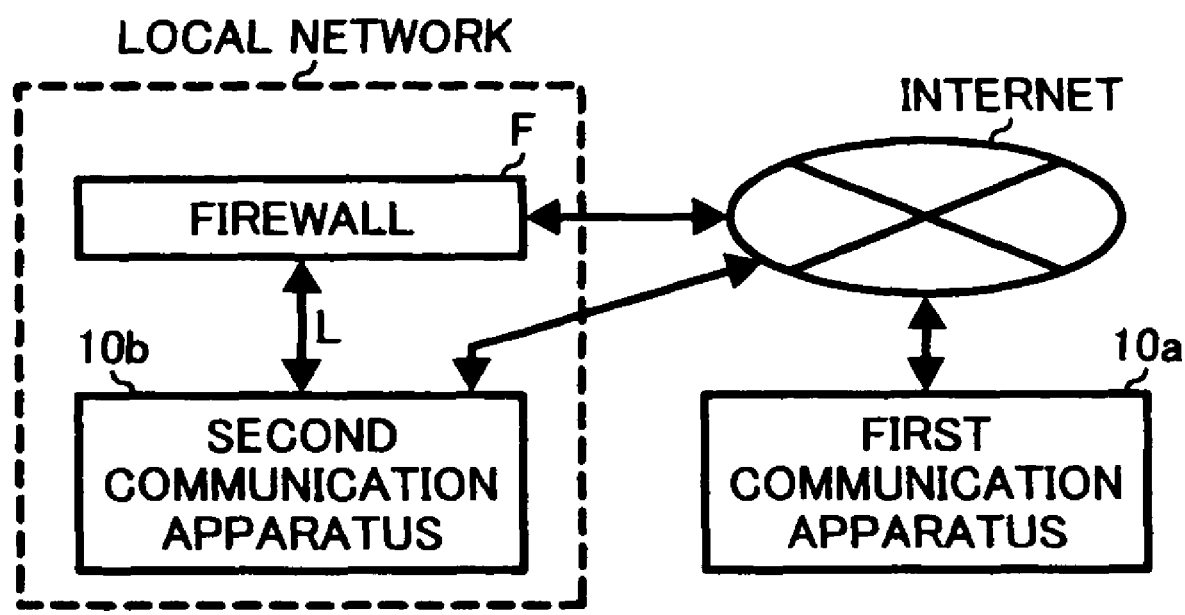
FIG. 7 illustrates an example communication system including a first communication apparatus and a second communication apparatus that communicate with each other using more than one communication procedure or protocol.

As described above referring to FIG. 6, the communication apparatus 10 can communicate with one or more communication apparatuses on a network, for example, as illustrated in FIG. 7.

The communication system shown in FIG. 7 includes a first communication apparatus 10a and a second communication apparatus 10b, which are connected with each other via the Internet. The first and second communication apparatuses 10a and 10b may each have the functional structure similar to any one of the above-described structures shown in FIGS. 3 to 6 or any one of the other structures that may be apparent to those skilled in the art.

Figure 1:
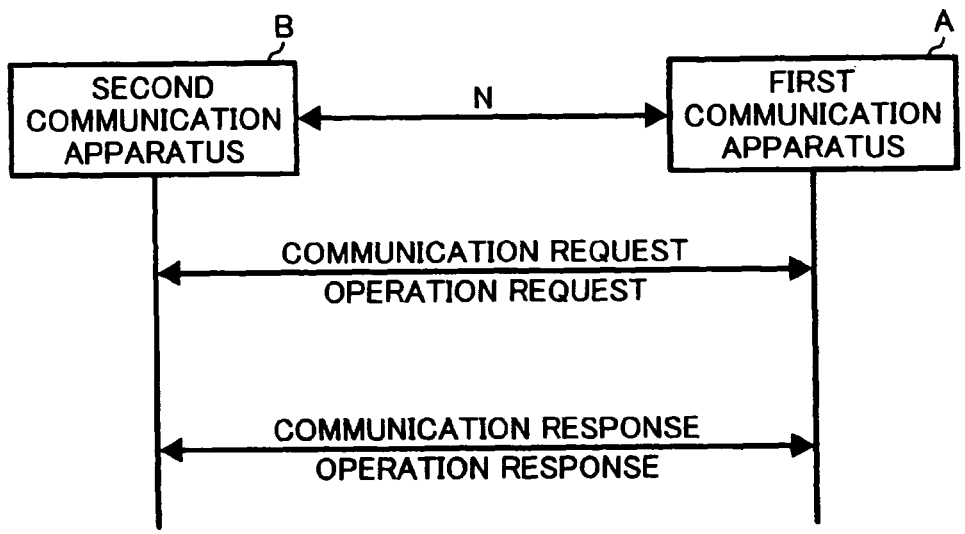
FIG. 1 illustrates a sequence of example commands exchanged between a first communication apparatus and a second communication apparatus that communicate with each other without a firewall.

Referring to FIG. 7, in one example, the first communication apparatus 10a and the second communication apparatus 10b communicate with each other via the Internet. In such case, the first communication apparatus 10a and the second communication apparatus 10b may communicate using the second communication procedure, for example, in a substantially similar manner as described above referring to FIG. 1. Alternatively, the first communication apparatus 10a and the second communication apparatus 10b may communicate with each other using the second message controller 15 of FIG. 3, using the second message controller 50 of FIG. 6, or using the second protocol as described above referring to FIG. 4.

Figure 2:
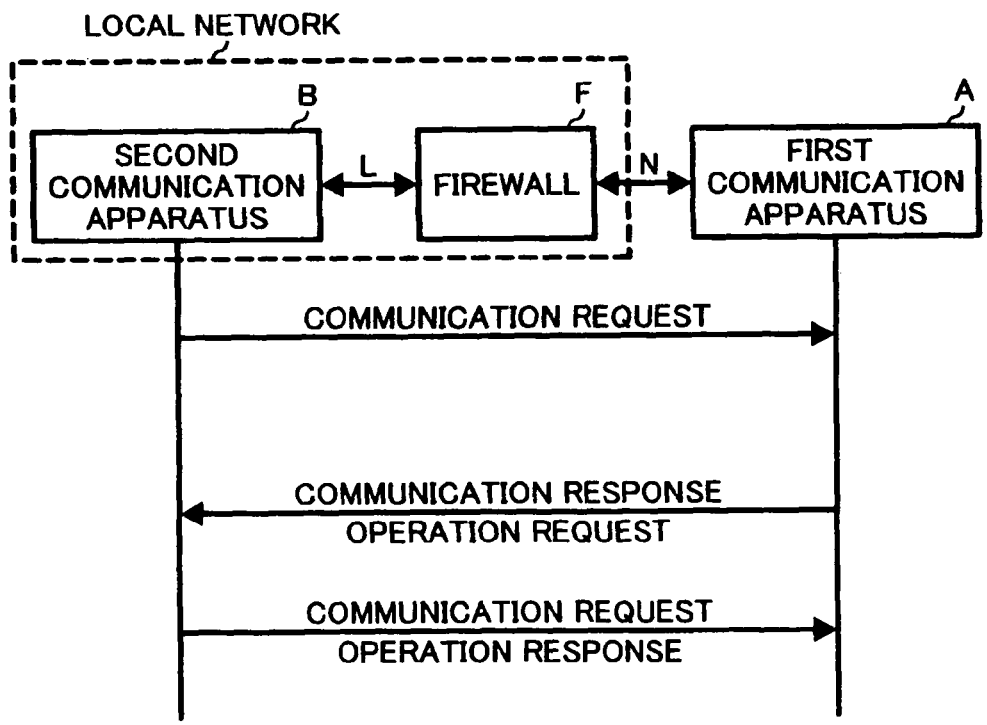
FIG. 2 illustrates a sequence of example commands exchanged between a first communication apparatus and a second communication apparatus that communicate with each other via a firewall.

In another example, the first communication apparatus 10a and the second communication apparatus 10b communicate with each other via the firewall F. As shown in FIG. 7, the firewall F is located inside of the local network having the second communication apparatus 10b. In such case, the second communication apparatus 10b may establish communication with the first communication apparatus 10a, using the first communication procedure as described above referring to FIG. 2, or the second communication procedure as described above referring to FIG. 1, in compliance with the first protocol. Alternatively, the second communication apparatus 10b may establish communication with the first communication apparatus 10a using the first message controller 14 or second message controller 15 of FIG. 3, or using the first message controller 40 or second message controller 50 of FIG. 6, in compliance with the first protocol. The first communication apparatus 10a may establish communication with the second communication apparatus 10b using the first communication procedure, for example, as described above referring to FIG. 2, in compliance with the first protocol. Alternatively, the first communication apparatus 10a may establish communication with the second communication apparatus 10b using the first message controller 14 of FIG. 3 or the first message controller 40 of FIG. 6, in compliance with the first protocol.

Figure 8:
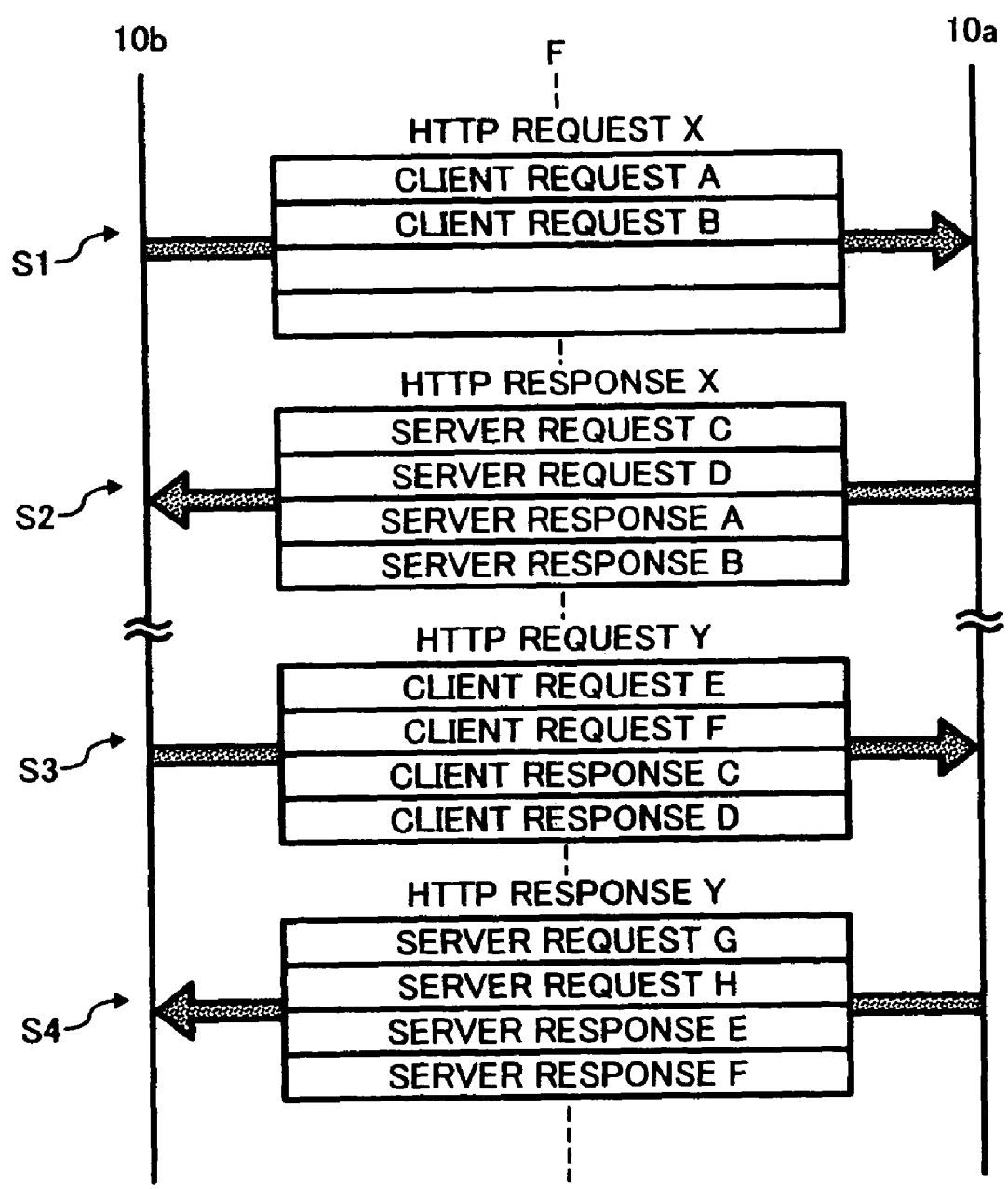
FIG. 8 illustrates a sequence of example commands exchanged between the first communication apparatus and the second communication apparatus, shown in FIG. 7, when the first communication apparatus and the second communication apparatus communicate with each other via a firewall.
Figure 9:
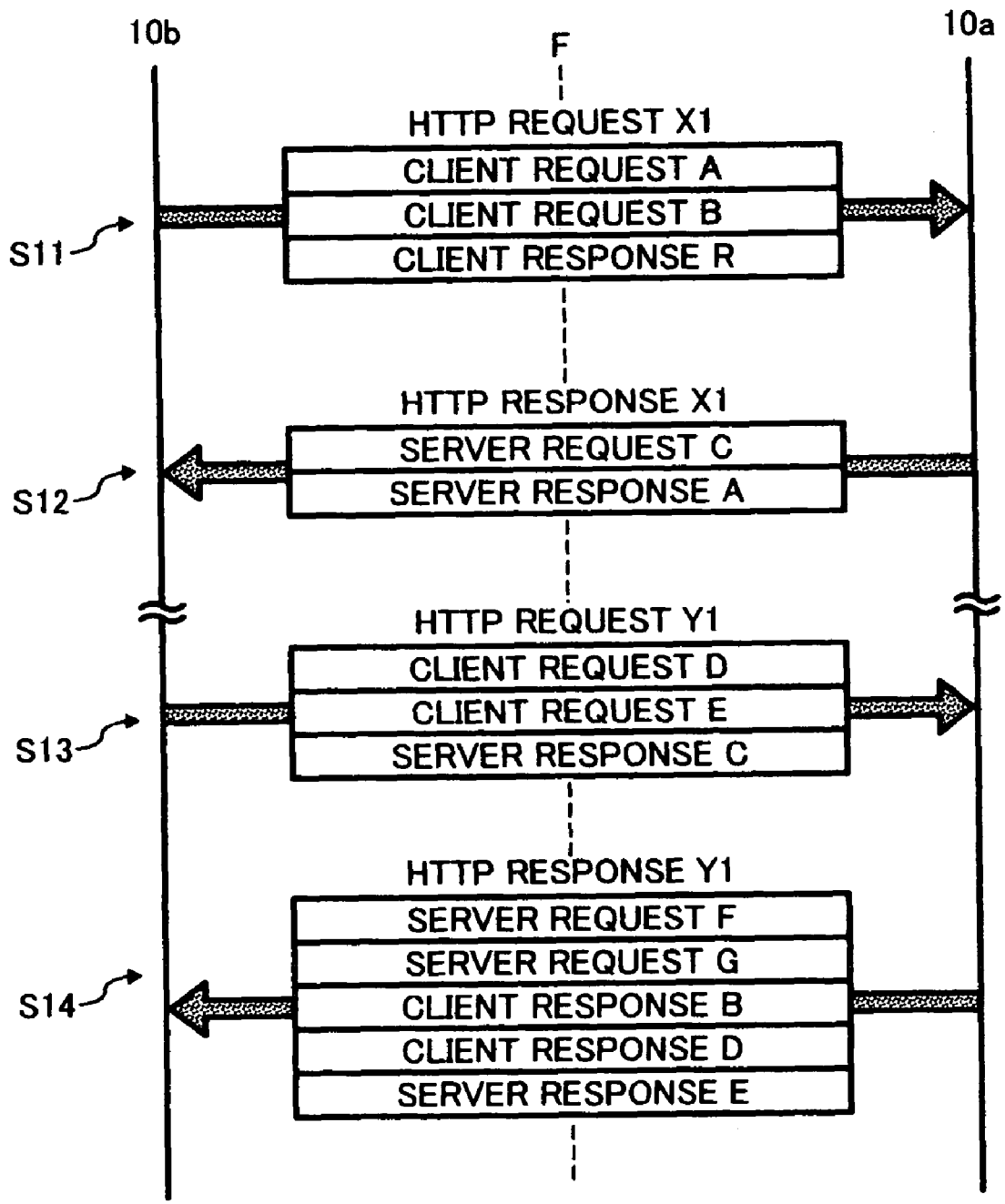
FIG. 9 illustrates a sequence of example commands exchanged between the first communication apparatus and the second communication apparatus, shown in FIG. 7, when the first communication apparatus and the second communication apparatus communicate with each other via a firewall.
Figure 10:
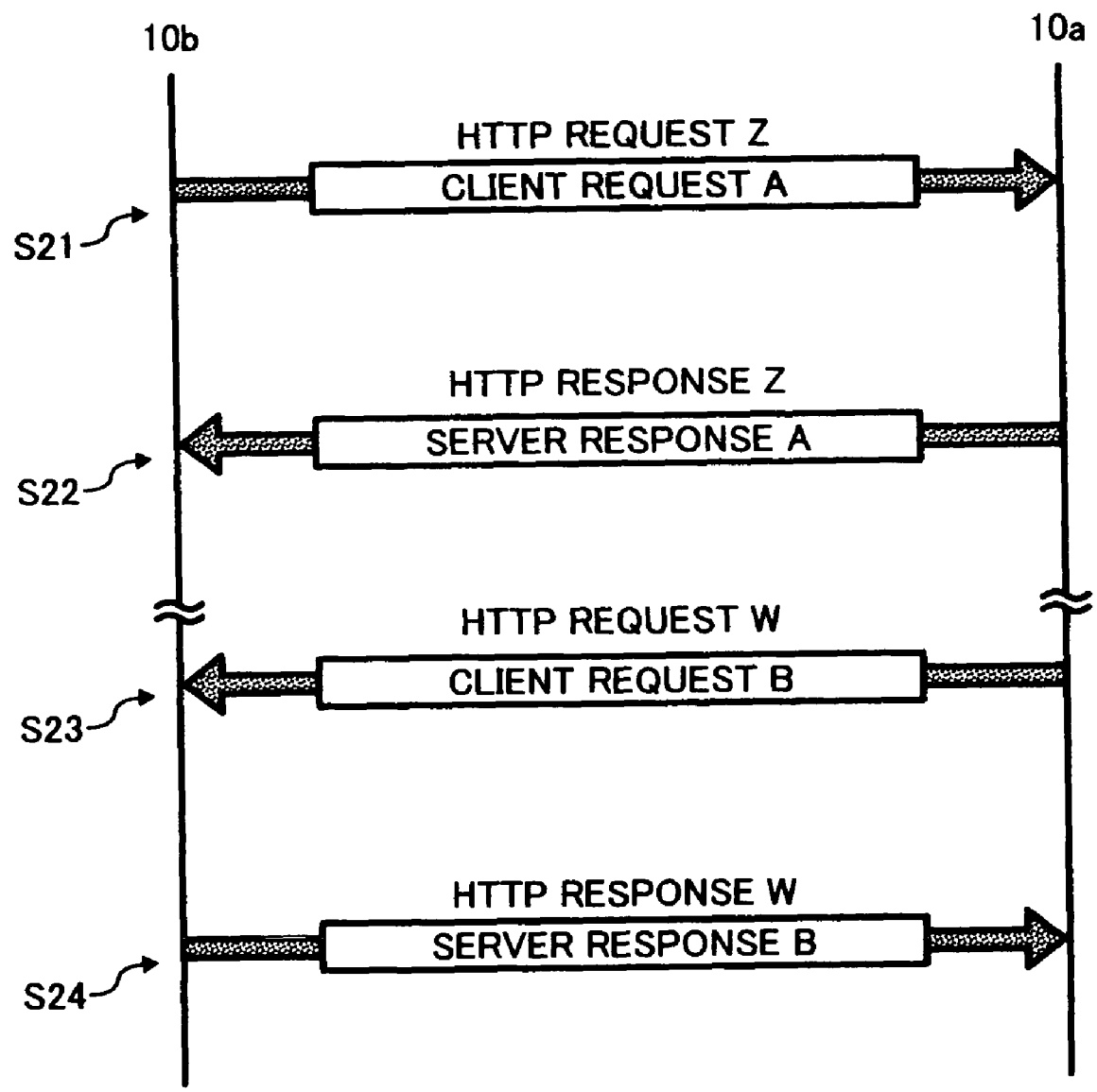
FIG. 10 illustrates a sequence of example commands exchanged between the first communication apparatus and the second communication apparatus, shown in FIG. 7, when the first communication apparatus and the second communication apparatus communicate with each other without a firewall.

Referring now to FIGS. 8 to 10, operation of sending or receiving a command, performed by the communication system of FIG. 7, is explained according to example embodiments of the present invention. FIGS. 8 and 9 each illustrate a sequence of example commands exchanged between the first communication apparatus 10a and the second communication apparatus 10b, which communicate with each other through the Internet via the firewall F. FIG. 10 illustrates a sequence of example commands exchanged between the first communication apparatus 10a and the second communication apparatus 10b, which communicate with each other directly via the Internet, without the firewall F between the apparatuses 10a and 10b.

In the example case illustrated in FIG. 8, the firewall F is provided between the first communication apparatus 10a and the second communication apparatus 10b. The first communication apparatus 10a is provided outside of the local network having the firewall F and the second communication apparatus 10b. With this configuration, the first communication apparatus 10a functions as a server, while the second communication apparatus 10b functions as a client.

Assuming that the first communication apparatus 10a and the second communication apparatus 10b each have the structure shown in FIG. 6, the first communication apparatus 10a and the second communication apparatus 10b communicate with each other using the first message controller 40 of FIG. 6.

Figure 11:
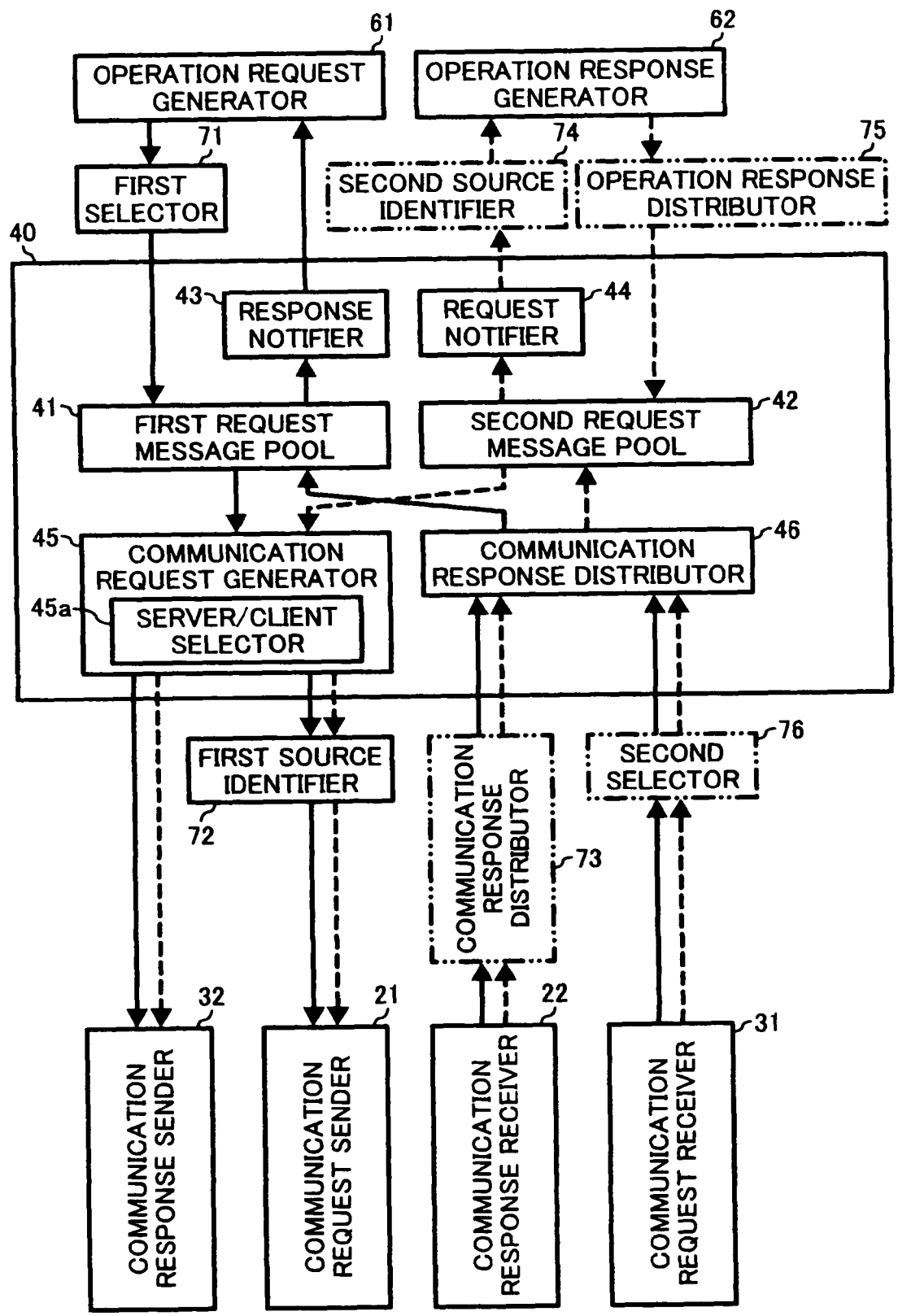
FIG. 11 illustrates the functional structure of a first message controller of the communication apparatus shown in FIG. 6.

For example, the first message controller 40 of either one of the first communication apparatus 10a and the second communication apparatus 10b may have the functional structure shown in FIG. 11. The first message controller 40 of FIG. 11 may include a first request message pool 41, second request message pool 42, response notifier 43, response notifier 44, communication request generator 45 including a server/client selector 45a, and/or communication response distributor 46.

Referring now to FIGS. 8 and 11, operation of sending or receiving a command via the firewall F, performed by the communication system of FIG. 7, is explained according to an example embodiment of the present invention.

At S1 of FIG. 8, the second communication apparatus 10b, which functions as the client, sends a HTTP request X to the first communication apparatus 10a via the firewall F. For example, referring to FIG. 11, the operation request generator 61 of the second communication apparatus 10b generates a client operation request A. The first selector 71 selects the first message controller 40 based on the presence or location of the firewall F. The client operation request A is stored in the first request message pool 41 as a client request message A. In this example, the client request message includes various information regarding the client operation request, such as the command ID, method name, input parameter, notifying destination, output parameter, etc., which may be written in the form of a client command sheet, for example, as described in the US Patent Application Publication No. 2004/0148328 ("the '328 patent Publication"), published on Jul. 29, 2004, the entire contents of which are hereby incorporated by reference.

Still referring to FIGS. 8 and 11, the operation request generator 61 of the second communication apparatus 10b may further generate a client operation request B, and store the client operation request B in the first request message pool 41 as a client request message B. The above-described function of storing a client operation request may be performed by the operation request generator 61 or the first selector 71.

The communication request generator 45 of the second communication apparatus 10b reads out the client request message A and the client request message B, and generates the HTTP request X that contains the messages A and B. In this example, the message A or B may be generated as a SOAP envelope using the Extensible Markup Language (XML). The header of the SOAP envelope may include identification information regarding the message, such as information indicating whether the message corresponds to an operation request or operation response, the command ID, etc. The body of the SOAP envelope may include specific information regarding the message, such as the method name, input parameter, etc. The SOAP envelope is put into one part of the HTTP request. Thus, the HTTP request X has the multi-part data structure. The examples of the multi-part HTTP request are illustrated, for example, in the '328 patent Publication.

Still referring to FIG. 11, the communication request generator 45 of the second communication apparatus 10b sends the HTTP request X to the communication request sender 21 via the first source identifier 72. In this example, the server/ client selector 45a selects either one of the communication request sender 21 and the communication response sender 32 based on whether the second communication apparatus 10b function as a server or client. In this example, the communication request sender 21 is selected.

As described above referring to FIG. 6, the server/client 45a may determine whether the second communication apparatus 10b functions as a server or a client based on the location of the firewall relative to the second communication apparatus 10b. Alternatively, the selection may be previously made if the configuration of the second communication apparatus 10b relative to the configuration of the first communication apparatus 10a is determined. Alternatively, the selection may be made manually or automatically, for example, by changing the parameter value.

At S2 of FIG. 8, the second communication apparatus 10b receives a HTTP response X from the first communication apparatus 10a. For example, referring to FIG. 11, the response receiver 22 of the second communication apparatus 10b receives the HTTP response X, which is generated by the first communication apparatus 10a. Referring back to FIG. 8, the HTTP response X contains a server request message C, server request message D, server response message A, and server response message B. As described above referring to the HTTP request X1, the HTTP response X1 has the multipart data structure, for example, as described in the '328 patent Publication.

The server request message C or D may be generated by the first communication apparatus 10a in a substantially similar manner as described above. The server response message A indicates the result obtained by performing a requested service requested by the client operation request A. The server response message B indicates the result obtained by performing a requested service requested by the client operation request B.

Referring to FIG. 11, the response receiver 22 of the second communication apparatus 10b sends the HTTP response X to the communication response distributor 46 of the first message controller 40 based on the selection made by the second selector 73.

The communication response distributor 46 extracts each message from the HTTP response X, and distributes the extracted message to either one of the first request message pool 41 and the second request message pool 42. For example, the communication response distributor 46 respectively extracts the server request message C and the server request message D, and stores the messages C and D in the second request message pool 42. In this example, the server request message C or D may be stored in the form of a server command sheet, for example, as described in the '328 patent Publication. The communication response distributor 46 respectively extracts the server response message A and the server response message B, and stores the messages A and B in the first request message pool 41. The server response message A or B may be stored in a corresponding manner with the client request message A or B. In this example, the client command sheet, which is stored in the first request message pool 41, is updated with the information provided by the server response message A or B, as described in the '328 patent Publication.

Once the server request message C or D is stored in the second request message pool 42, the request notifier 44 notifies the operation response generator 62 that the server request message C or D is received. Upon notification, the second communication apparatus 10b initiates the requested service requested by the server request message C or D. Accordingly, the second communication apparatus 10b does not need to search through the second request message pool 42 for a requested service.

Once the client response message A or B is stored in the first request message pool 41, the response notifier 43 notifies the operation request generator 61 that the client response message A or B is received. The operation request generator 61 does not need to search through the first request message pool 41 to determine whether the operation request A or B is completed.

At S3 of FIG. 8, the second communication apparatus 10b sends a HTTP request Y to the first communication apparatus 10a in a substantially similar manner as described above referring to S1. As shown in FIG. 8, the HTTP request Y includes a client request messages E, client request message F, client response message C, and client response message D.

At S4 of FIG. 8, the second communication apparatus 10b receives a HTTP response Y from the first communication apparatus 10b in a substantially similar manner as described above referring to S2. As shown in FIG. 8, the HTTP response Y includes a server request message G, server request message H, server response message E, and server response message F.

Referring now to FIG. 9, operation of sending or receiving a command via the firewall F, performed by the communication system of FIG. 7, is explained according to an example embodiment of the present invention. The operation of FIG. 9 is substantially similar to the operation of FIG. 8, except for the contents of information included in the HTTP request or response.

At S11 of FIG. 9, the second communication apparatus 10b, which functions as the client, sends a HTTP request X1 to the first communication apparatus 10a via the firewall F. The HTTP request X1 includes a client request message A, client request message B, and client response message R.

At S12 of FIG. 9, the second communication apparatus 10b receives a HTTP response X1 from the first communication apparatus 10a. The HTTP response X1 includes a server request message C and server response message A.

At S13 of FIG. 9, the second communication apparatus 10b sends a HTTP request Y1 to the first communication apparatus 10a. The HTTP request Y1 includes a client request message D, client request message E, and server response message C.

At S14 of FIG. 9, the second communication apparatus 10b receives a HTTP response Y1 from the first communication apparatus 10a. The HTTP response Y1 includes a server request message F, server request message G, client response message B, client response message D, and server response message E.

As illustrated in FIG. 8 or 9, any number of messages or SOAP envelopes may be put into one HTTP request or response. As illustrated in FIG. 9, the order of sending or receiving the messages may be adjusted, for example, based on priority information.

Alternatively, the communication apparatus 10, which functions as a client, may send the HTTP request, such as the HTTP header information, to the counterpart communication apparatus without putting any message in the HTTP request. After a session starts, the communication apparatuses may exchange a message as it is generated. To complete the session, the communication apparatus 10 sends a command indicating that the session is closed. This may lower the memory requirement of the communication apparatus 10.

In the example case illustrated in FIG. 10, there is no firewall provided between the first communication apparatus 10a and the second communication apparatus 10b. In such case, the first communication apparatus 10a and the second communication apparatus 10b both communicate using the second message controller 50 of FIG. 6.

Figure 12:
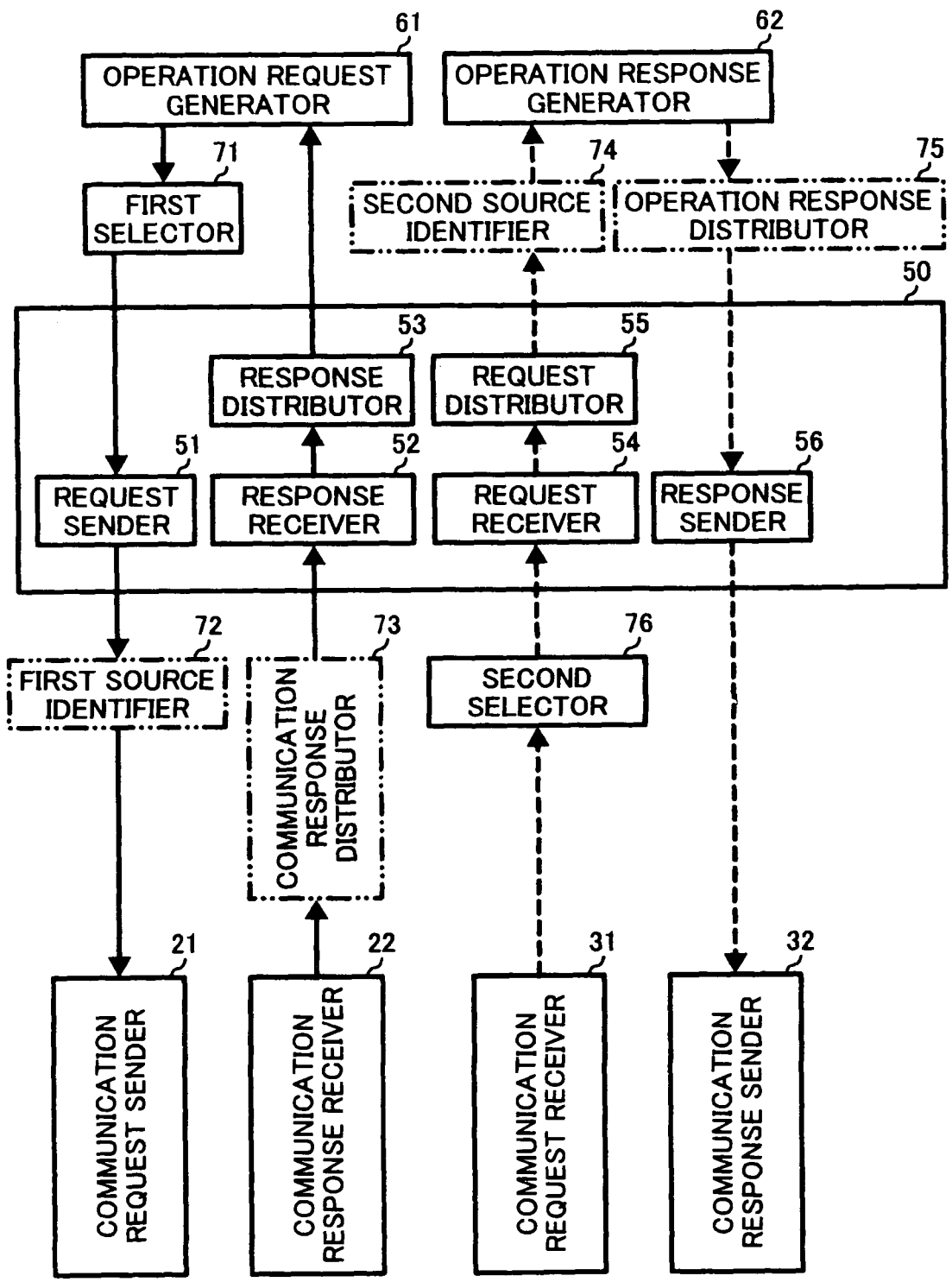
FIG. 12 illustrates the functional structure of a second message controller of the communication apparatus shown in FIG. 6.

For example, the second message controller 50 of either one of the first communication apparatus 10a and the second communication apparatus 10b may have the functional structure shown in FIG. 12. The second message controller 50 of FIG. 12 may include a request sender 51, response receiver 52, response distributor 53, request receiver 54, request distributor 55, and/or response sender 56.

Referring now to FIGS. 10 and 12, operation of sending or receiving a command without the firewall F, performed by the communication system of FIG. 7, is explained according to an example embodiment of the present invention.

At S21 of FIG. 10, the second communication apparatus 10b, which functions as a client, sends a HTTP request Z to the first communication apparatus 10a directly via the Internet. For example, referring to FIG. 12, the operation request generator 61 of the second communication apparatus 10b generates a client operation request A. The first selector 71 selects the second message controller 50 since the firewall F is not provided between the first communication apparatus 10a and the second communication apparatus 10b. In this example, the client operation request A may be generated as a client request message A, which may include various information regarding the client operation request, as described above referring to FIG. 11. The request sender 51 generates the HTTP request Z that contains the client request message A. The HTTP request Z is sent to the first communication apparatus 10a through the first source identifier 72 and the communication request sender 21.

At S22 of FIG. 10, the second communication apparatus 10b receives a HTTP response Z from the first communication apparatus 10a. Referring to FIG. 12, the response receiver 22, which receives the HTTP response Z, sends the HTTP response Z to the response receiver 52 via the communication response distributor 73. The response receiver 52 extracts a server response message A from the HTTP response Z, and sends the response message A to the response distributor 53. The response distributor 53 distributes the server response message A to the operation request generator 61. In this example, information regarding the client request message A may be previously stored in the response distributor 53 when the client request message A is generated by the operation request generator 61. Upon receiving the server response message A, the response distributor 53 determines that the client request message A has been completed.

At S23 of FIG. 10, the second communication apparatus 10b, which functions as a server, receives a HTTP request W from the first communication apparatus 10a. The communication request receiver 31 receives the HTTP request W, and sends the HTTP request W to the request receiver 54 through the second selector 76. In this example, the second selector 76 selects either one of the first message controller 40 and the second message controller 50, for example, based on the header information of the HTTP request, or based on whether the HTTP request has the multi-part structure. The request receiver 54 extracts a client request message B from the HTTP request W. The request distributor 55 sends the client request message B to the operation response generator 62. The operation response generator 62 generates an operation response by performing a requested service requested by the operation request B of the first communication apparatus 10a.

At S24 of FIG. 10, the second communication apparatus 10b, which functions as a server, sends a HTTP response W to the first communication apparatus 10a. For example, the operation response generator 62 sends the operation response, which is generated based on the client request message B, to the response sender 56 through the operation response distributor 75. The response sender 56 generates the HTTP response W, and sends the HTTP response W to the second communication apparatus 10b via the communication response sender 32.

In this example, the HTTP request or HTTP response contains a single message. However, more than one message may be included in the HTTP request or response.

In any one of the example cases described above referring to FIGS. 8 to 10, the first communication apparatus 10a and the second communication apparatus 10b of FIG. 7 are assumed to each have the structure shown in FIG. 6. However, if the first communication apparatus 10a and the second communication apparatus 10b are configured to always function as a server and a client, respectively, the client service 20 may not be necessary for the first communication apparatus 10a, while the server service 30 may not be necessary for the second communication apparatus 10b.

Figure 13B:
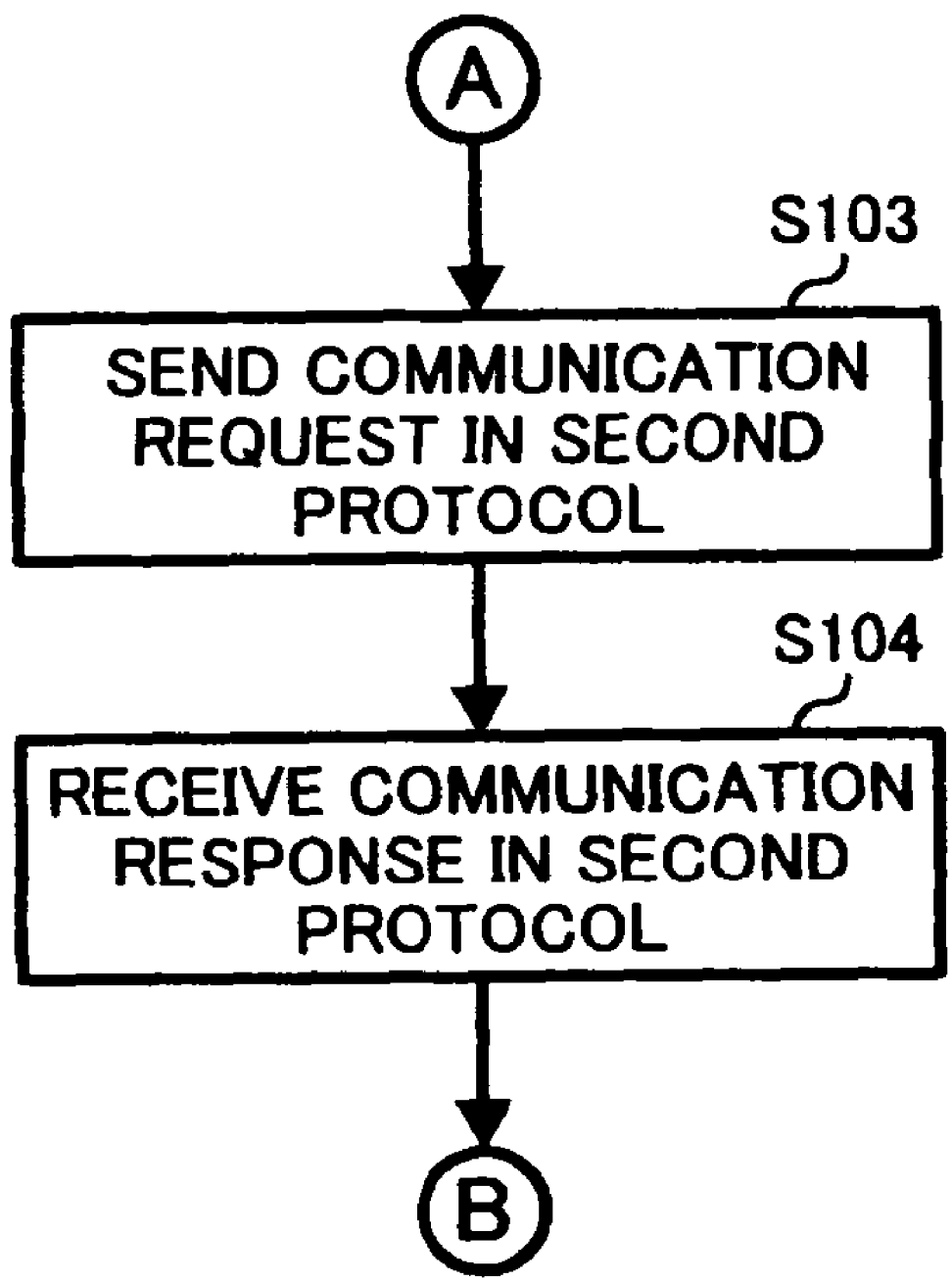

Referring now to FIG. 13, operation of sending an operation request and receiving an operation response corresponding to the operation request is explained according to an example embodiment of the present invention. The operation of FIG. 13 may be performed by any one of the above-described communication apparatuses, which is capable of communicating with a counterpart communication apparatus.

Step S101 generates an operation request to be sent to the counterpart communication apparatus.

Step S102 determines whether the communication apparatus communicates with the counterpart communication apparatus via the firewall to generate a first determination result. If the first determination result indicates that the firewall is provided between the communication apparatus and the counterpart communication apparatus ("YES" in Step S102), the operation proceeds to Step S105. Otherwise ("NO" in Step S102), the operation proceeds to Step S103.

Step S103 sends a communication request, which contains the operation request, to the counterpart communication apparatus in compliance with a second protocol.

Step S104 receives a communication response, which contains an operation response corresponding to the operation request, from the counterpart communication apparatus in compliance with the second protocol.

Step S105 determines whether the communication apparatus is located outside of a local network including the counterpart communication apparatus and the firewall to generate a second determination result. If the second determination result indicates that the communication apparatus is located outside of the local network ("YES" in Step S105), the operation proceeds to Step S108. Otherwise ("NO" in Step S105), the operation proceeds to Step S106.

Step S106 sends a communication request, which contains the operation request, to the counterpart communication apparatus in compliance with a first protocol.

Step S107 receives a communication response, which contains an operation response corresponding to the operation request, from the counterpart communication apparatus in compliance with the first protocol.

Step S108 determines whether a communication request is received from the counterpart communication apparatus. If the communication request is received ("YES" in Step S108), the operation proceeds to Step S109. Otherwise ("NO" in Step S108), the operation repeats Step S108.

Step S109 sends the operation request to the counterpart communication apparatus in compliance with the first protocol. In this example, the operation request may be put into a communication response, which corresponds to the communication request received in Step S108.

Step S110 receives the operation response from the counterpart communication apparatus in compliance with the first protocol. In this example, the operation response may be put into a communication request.

Step S111 acknowledges the completion of the operation request, and the operation ends.

The operation of FIG. 13 may be performed in various other ways. For example, any one of the steps illustrated in FIG. 13 may be performed in different orders.

Figure 14:
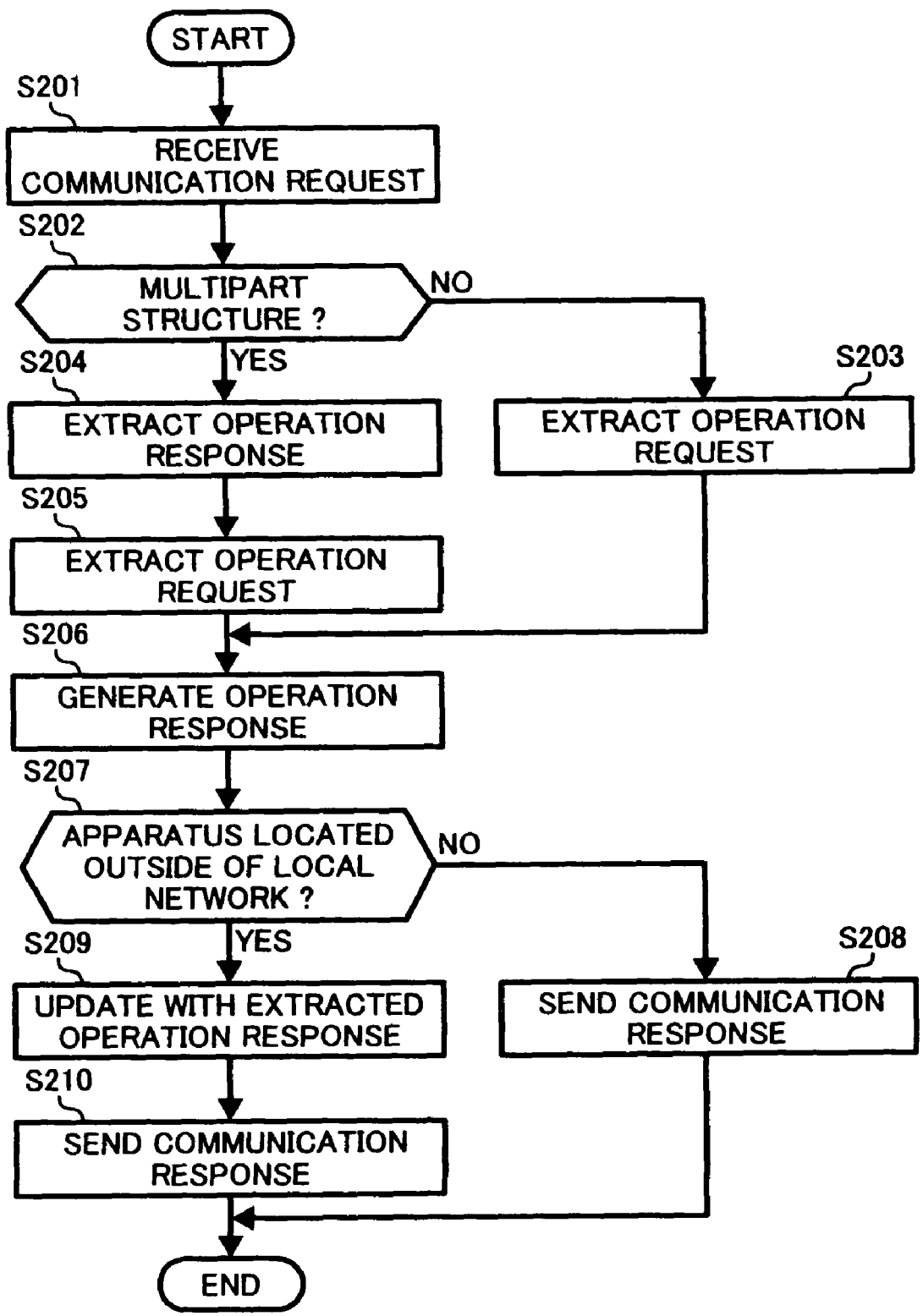
FIG. 14 is a flowchart illustrating operation of receiving an operation request and sending an operation response corresponding to the operation request according to an example embodiment of the present invention.

Referring now to FIG. 14, operation of receiving an operation request and sending an operation response corresponding to the operation request is explained according to an example embodiment of the present invention. The operation of FIG. 14 may be performed by any one of the above-described communication apparatuses, which is capable of communicating with a counterpart communication apparatus.

Step S201 receives a communication request from the counterpart communication apparatus.

Step S202 determines whether the communication request has the multi-part structure. If the communication request has the multi-part structure ("YES" in Step S202), the operation proceeds to Step S204. Otherwise ("NO" in Step S202), the operation proceeds to Step S203.

Step S203 extracts an operation request from the communication request.

Step S204 extracts one or more operation responses, if any, from the communication request. The extracted operation responses may be stored for later use.

Step S205 extracts one or more operation requests from the communication request.

Step S206 performs a requested service requested by the operation request, and generates an operation response indicating the result of performing the requested service.

Step S207 determines whether the communication apparatus is located outside of a local network including the counterpart communication apparatus and the firewall to generate a second determination result. If the second determination result indicates that the communication apparatus is located outside of the local network ("YES" in Step S207), the operation proceeds to Step S209. Otherwise ("NO" in Step S207), the operation proceeds to Step S208.

Step S208 sends a communication response, which contains the operation response generated in Step S206, to the counterpart communication apparatus.

Step S209 updates information contained in an operation request, which is generated by the communication apparatus, with the information contained in the operation response extracted in Step S204.

Step S210 sends a communication response, which contains the operation response generated by the communication apparatus.

The operation of FIG. 14 may be performed in various other ways. For example, the steps illustrated in FIG. 14 may be performed in different orders.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

Further, the first communication procedure or second communication procedure may be practiced in various other ways, for example, as described in the '328 patent Publication. In one example, the operation request or response may be expressed in any other form, for example, as the XML document. In another example, the SOAP message may be bridged to any other language, for example, the Common Object Request Broker Architecture (CORBA), JAVA, or Remote Method Invocation (RMI).

Furthermore, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

Figure 15:
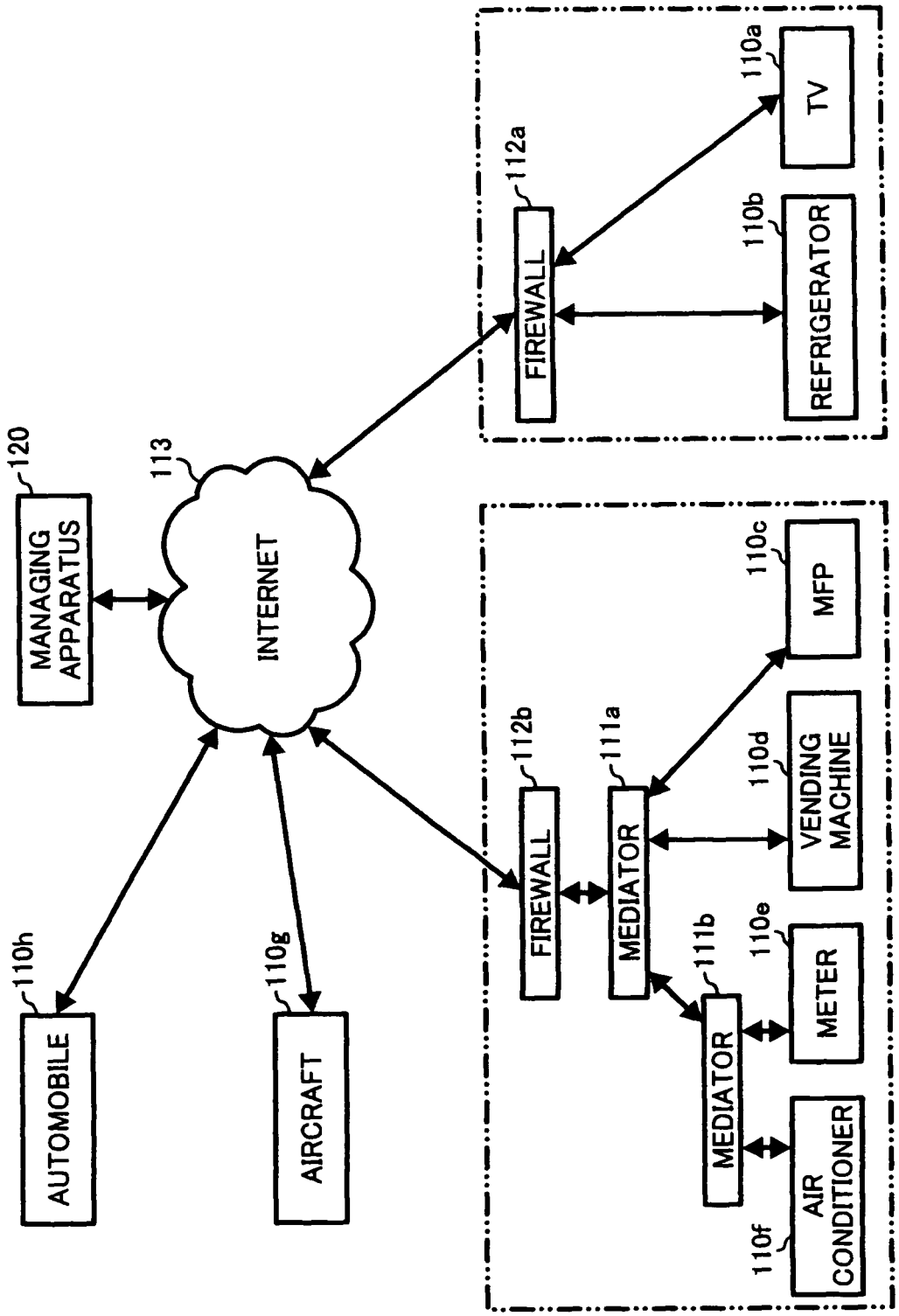
FIG. 15 illustrates a communication system according to an example embodiment of the present invention.

Alternatively, any one of the communication apparatuses described above may be used in a variety of communication systems. FIG. 15 illustrates a communication system, in which one or more communication apparatuses 110 are managed by a managing apparatus 120 via the Internet 113.

Referring to FIG. 15, the communication apparatus 110 include a television (TV) 110a, refrigerator 110b, MFP 110c, vending machine 110d, meter 110e, air conditioner 110f, aircraft 110g, and/or automobile 110h. In one example, the managing apparatus 120 may manage the communication apparatus 110 directly via the Internet 113. In another example, the managing apparatus 120 may manage the communication apparatus 110 via a firewall 112a. In another example, the managing apparatus 120 may mange the communication apparatus 110 via a firewall 112b, and at least one of mediators 111a and 111b. The firewall 112a or 112b may be implemented by, for example, a proxy server. The mediator 111a or 111b may be implemented by, for example, a gate.

For example, the managing apparatus 120 may request the MFP 110c to provide information regarding the MFP 110c, for example, counter information indicating the usage, device status information indicating whether the MFP 110c operates in good condition, firmware information indicating whether the MFP 110c needs to be updated, or supply information indicating whether any supply, such as toner, may be needed.

In one example communication procedure, the managing device 120 communicates with the MFP 110c via the firewall 112b. In such case, the managing device 120 is not allowed to initiate communication. Thus, the MFP 110c may send a communication request to the managing device 120 at a predetermined timing or any timing that may be necessary to start communication using the first communication procedure or protocol. Once the communication request is received, the managing device 120 sends an operation request to ask for information regarding the MFP 110c. The MFP 110c sends an operation response, which contains the requested information, to the management apparatus 120. Based on the requested information, the MFP 110c may determine the type of service that may be provided to the MFP 110c.

In another example communication procedure, the managing device 120 communicates with the MFP 110c directly via the Internet 13. In such case, the managing device 120 may initiate communication at any timing, using the second communication procedure or protocol.

In another example communication procedure, the managing device 120 communicates with the MFP 110c via the mediator 111a. In such case, the mediator 111a may initiate communication by sending a communication request to the managing apparatus 120. The managing apparatus 120 and the mediator 111a may communicate with each other using the first communication procedure or protocol. The mediator 111a and the MFP 110c may communicate with each other using the second communication procedure or protocol.

This patent application is related to and claims priority under 35 U.S.C. §119 to Japanese patent application No. 2005-150415, filed on May 24, 2005, in the Japanese Patent Office, the entire contents of which are hereby incorporated by reference.

The invention claimed is:

1. A communication system including first and second communication apparatuses connected through a network, said first communication apparatus comprising:
   a request sender configured to send a first communication request through a network to a second communication apparatus located at a prescribed site, the first communication request being a type of communication request sent from the first communication apparatus to the second communication apparatus;
   a response receiver configured to receive a processing result of processing the first communication request as a response from the second communication apparatus;
   a request receiver configured to receive a second communication request from the second communication apparatus, the second communication request being a type of communication request sent from the second communication apparatus to the first communication apparatus;
   a response sender configured to send a processing result of processing the second communication request as a response to the second communication apparatus;
   a second request message pool configured to store at least one processing result of a second communication request, when the second communication apparatus is located inside a firewall; and
   a first request message pool configured to store at least one first communication request to be sent to the second communication apparatus, when the second communication apparatus is located inside a firewall;
   wherein when the at least one first communication request is stored in the first request message pool, and the at least one processing result of the second communication request is completed and stored in the second request message pool, the response sender sends both of the at least one processing result stored in the second request message pool and the at least one first communication request stored in the first request message pool to the second communication apparatus, and
   wherein when the at least one processing result of the second communication request is not completed, the response sender temporarily sends the at least one first communication request stored in the first request message pool to the second communication apparatus without sending the at least one processing result of the second communication request, and sends the at least one processing result of the second communication request to the second communication apparatus when the at least one processing result of the second communication request is completed and a subsequent second communication request and a subsequent response to a previously sent first communication request is received from the second communication apparatus.

2. The communication system as claimed in claim 1, said second communication apparatus comprising:
   a response receiver configured to receive the processing result of processing the second communication request as a first response from the first communication apparatus; and
   a request processing device configured to process the first communication request even when the processing result of processing of the second communication request is excluded from the first response.

3. The communication system as claimed in claim 1, wherein one of groups of at least two second communication request processing results and at least two first communication requests is transmitted in a block per response.

4. The communication system as claimed in claim 3, wherein said at least two second communication request processing results and the at least two first communication requests are divided and processed in the second communication apparatus.

5. The communication system according to claim 1, said first communication apparatus comprising:
   a first message controller which includes the first request message pool and the second request message pool;
   a second message controller which includes a second request sender; and
   a first selector that receives the first communication request to be sent to the second communication apparatus, and when a firewall is located between the first communication apparatus and the second communication apparatus, the first selector selects the first message controller and provides the first communication request to the first request message pool, and when a firewall is not located between the first communication apparatus and the second communication apparatus, the first selector selects the second message controller and provides the first communication request to the second request sender which provides the first communication request to the request sender.

6. The communication system according to claim 5, wherein the first message controller further includes a server/client selector that selects one of the request sender and the response sender based on whether the second communication apparatus functions as a server or client.

7. A method, implemented on a communication system including first and second communication apparatuses connected through a network, comprising:
   sending, from a request sender of the first communication apparatus, a first communication request through a network to a second communication apparatus located at a prescribed site, the first communication request being a type of communication request sent from the first communication apparatus to the second communication apparatus;
   receiving, at a response receiver of the first communication apparatus, a processing result of processing the first communication request as a response from the second communication apparatus;
   receiving, at a request receiver of the first communication apparatus, a second communication request from the second communication apparatus, the second communication request being a type of communication request sent from the second communication apparatus to the first communication apparatus;
   sending, from a response sender of the first communication apparatus, a processing result of processing the second communication request as a response to the second communication apparatus;
   storing, at a second request message pool of the first communication apparatus, at least one processing result of a second communication request, when the second communication apparatus is located inside a firewall; and storing, at a first request message pool of the first communication apparatus, at least one first communication request to be sent to the second communication apparatus, when the second communication apparatus is located inside a firewall;

wherein when the at least one first communication request is stored in the first request message pool, and the at least one processing result of the second communication request is completed and stored in the second request message pool, the response sender sends both of the at least one processing result stored in the second request message pool and the at least one first communication request stored in the first request message pool to the second communication apparatus, and wherein when the at least one processing result of the second communication request is not completed, the response sender temporarily sends the at least one first communication request stored in the first request message pool to the second communication apparatus without sending the at least one processing result of the second communication request, and sends the at least one processing result of the second communication request to the second communication apparatus when the at least one processing result of the second communication request is completed and a subsequent second communication request and a subsequent response to a previously sent first communication request is received from the second communication apparatus.

8. The method as claimed in claim 7, further comprising:

receiving, at a response receiver of the second communication apparatus, a processing result of processing the second communication request as a first response from the first communication apparatus; and processing, at a request processing device of the second communication apparatus, the first communication request even when the processing result of processing of the second communication request is excluded from the first response.

9. The method as claimed in claim 7, wherein one of groups of at least two second communication request processing results and at least two first communication requests is transmitted in a block per response.

10. The method as claimed in claim 9, wherein said at least two second communication request processing results and the at least two first communication requests are divided and processed in the second communication apparatus.

11. The method as claimed in claim 9, further comprising:

receiving, at a first selector of the first communication apparatus, the first communication request to be sent to the second communication apparatus;

when a firewall is located between the first communication apparatus and the second communication apparatus, selecting, at the first selector, a first message controller which includes the first request message pool and the second request message pool, and providing the first communication request to the first request message pool; and when a firewall is not located between the first communication apparatus and the second communication apparatus, selecting, at the first selector, a second message controller which includes a second request sender, and providing the first communication request to the second request sender which provides the first communication request to the request sender.

12. The method as claimed in claim 11, further comprising:

selecting, at a server/client selector of the first message controller, one of the request sender and the response sender based on whether the second communication apparatus functions as a server or client.

* * * * *